W. B. ALLBRIGHT.
HYDROGENATING APPARATUS.
APPLICATION FILED NOV. 5, 1919.

1,404,709.

Patented Jan. 24, 1922.
2 SHEETS—SHEET 1.

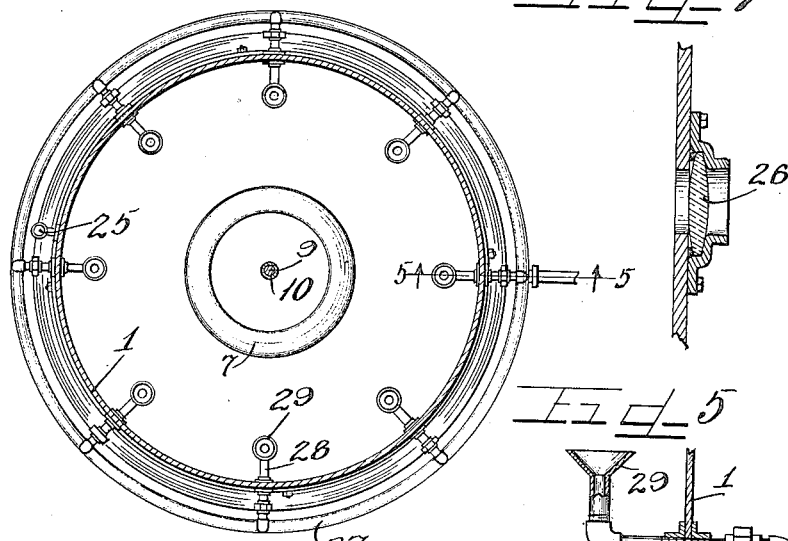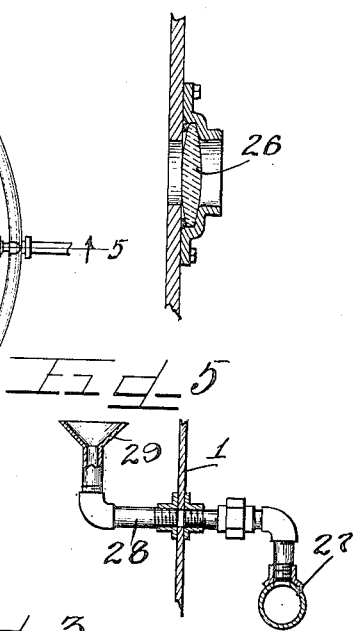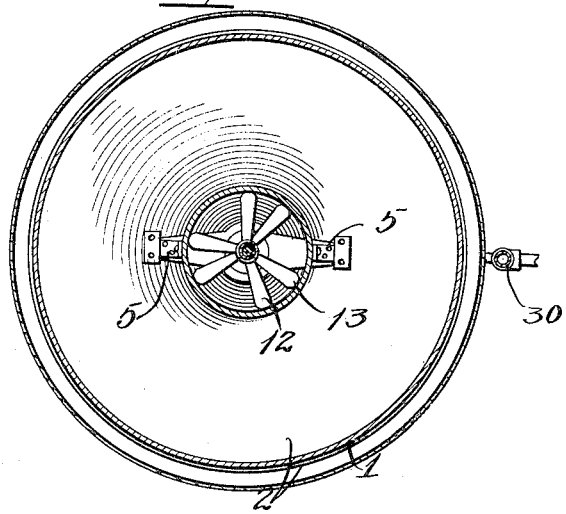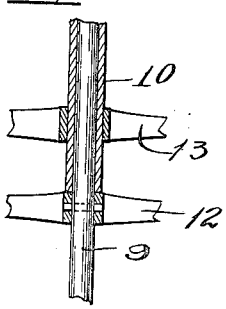

UNITED STATES PATENT OFFICE.

WILLIAM B. ALLBRIGHT, OF CHICAGO, ILLINOIS.

HYDROGENATING APPARATUS.

1,404,709.                        Specification of Letters Patent.      Patented Jan. 24, 1922.

Original application filed June 28, 1915, Serial No. 36,739. Divided and this application filed November 5, 1919, Serial No. 335,813. Renewed September 22, 1920. Serial No. 412,085.

*To all whom it may concern:*

Be it known that I, WILLIAM B. ALLBRIGHT, a citizen of the United States, and a resident of the city of Chicago, in the county of Cook and State of Illinois, have invented certain new and useful Improvements in a Hydrogenating Apparatus; and I do hereby declare that the following is a full, clear, and exact description of the same, reference being had to the accompanying drawings, and to the numerals of reference marked thereon, which form a part of this specification.

This application constitutes a division of my copending application for patent for "hydrogenating processes," filed on the 28th day of June, 1915, Serial No. 36,739, renewed September 22nd, 1920, with Serial No. 412,085.

This invention relates to an improved apparatus for effecting hydrogenation of oils, fats, fatty acids, their glycerids, and other esters, etc., by means of mixing the same with catalytic agents within a container by means of a mechanism causing an upward flow through a cylinder disposed within said container and a downward flow near the walls of the container to bring about the reaction to cause hydrogenation to take place by exposing the flowing mixture to the action of hydrogen gas which is drawn through a thin bubbling mass of the material carrying the catalyzer in suspension and then causing the associated elements to flow through skimming devices to permit a flow outwardly therefrom and back into the container.

It is an object of this invention to provide an improved form of hydrogenating apparatus wherein is provided a positive means of exposing an oil or fat carrying in suspension a finely divided catalyzer, to the action of hydrogen gas, and in a manner to overcome the difficulties heretofore encountered and further to facilitate handling of the gas and oil to promote the progress of the process.

An important object of this invention is the construction of a hydrogenating mechanism wherein oils or fats to be treated are thoroughly mixed with a catalyzer within a container and induced to flow upwardly through a cylinder in a manner to prevent the formation of vortices or centrifugal action, after which the mixture flows into a hydrogen chamber within said container whereby the bubbling mixture is permitted to flow outwardly through skimming devices drawing gaseous hydrogen therewith through restricted passages and introducing the associated elements again into the main body of the mixture within the container, thus tending to set up a flow through a more or less confined passage, and thereby permitting the contents to again be spilled through the gas filled space back upon the surface of the main body of the associated elements to be drawn through the skimmers, drawing gaseous hydrogen therewith.

Another important object of this invention is the construction of an oil or fat hydrogenating mechanism wherein a container is provided with a cylinder which projects upwardly through a mixture to be treated into a hydrogen chamber, and is provided with devices operating in opposite directions to induce an upward flow in said cylinder without creating a centrifugal action, thus causing the elements to be spilled through the hydrogen chamber and out through skimmers to be returned into the field of operation of the moving devices.

A further object of the invention is to provide means whereby the catalyzer is kept in suspension in the oil or fat more particularly by giving the bottom of the container a conical form and admitting hydrogen into the container at the apex of the conical bottom to agitate and mix with the oil or fat any catalyzer which may settle to the bottom of the container.

It is also an object of the invention to provide means for introducing bubbles of hydrogen into the oil or fat and subsequently breaking up these bubbles into smaller bubbles and disseminating these through the oil to produce the desired intimate contact between the oil and the hydrogen. This is especially important since it appears that the hydrogen reaches the catalyzer only through solution in the oil. Once the catalyzer is wetted with the oil there can no longer be any actual contact with the gas since the forces of adhesion effectually seal the catalyzer surface from the gas and no measure of agitation by ordinary mixing apparatus will dislodge the film of oil. Subdivision of the large bubbles and dissemination of the fine bubbles through the oil does, however, greatly aid in maintaining a saturated solution of hydrogen in the oil in spite of the hydrogen taken from solution by the oil in the immediate vicinity of the catalyzer particles.

Other and further important objects of this invention will be apparent from the disclosures in the drawings and specification.

The invention (in a preferred form) is illustrated in the drawings and hereinafter more fully described.

On the drawings:

Figure 2 is an enlarged sectional view taken on line 2—2 of Figure 1.

Figure 3 is an enlarged sectional view taken on line 3—3 of Figure 1.

Figure 4 is a sectional view of an eye piece provided in the side of the container or cylinder.

Figure 5 is an enlarged detail section taken on line 5—5 of Figure 2, with parts shown in elevation.

Figure 6 is a fragmentary sectional detail illustrating the connection of the propeller paddle wheels to the means for operating the same within the cylinder.

As shown on the drawings:

Figure 1:
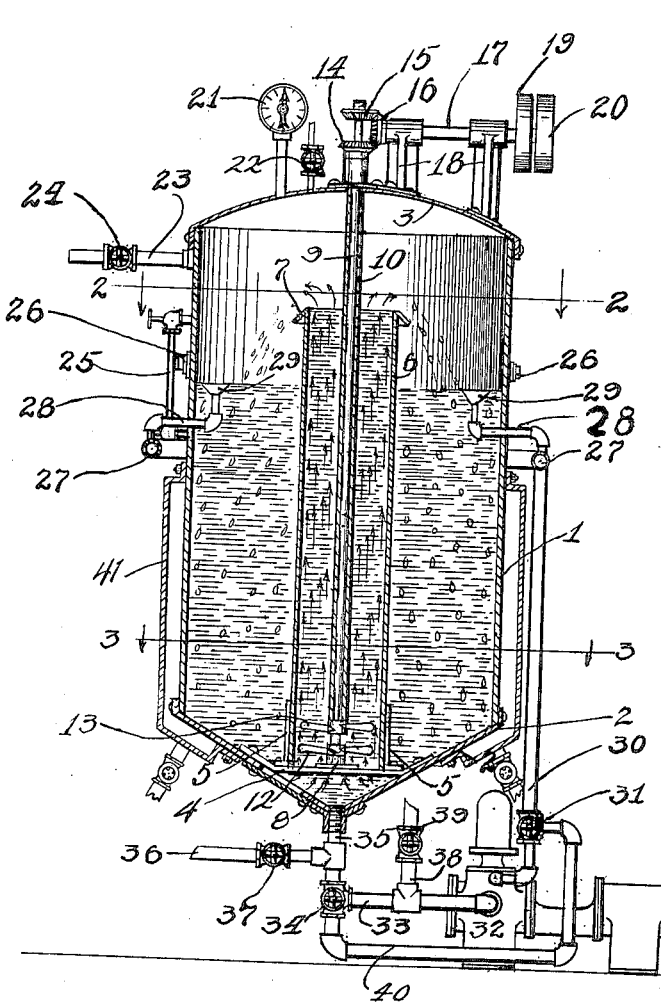
Figure 1 is a sectional elevation of the apparatus.

The apparatus consists of a cylinder or tank 1, having a conical bottom 2, and a dome-shaped top 3. A cross-piece 4, is secured upon the conical bottom 2, having brackets 5, attached thereto, which serve to support a tall narrow cylinder 6, situated axially within said main cylinder 1, and the inner cylinder projects upwardly within said cylinder 1, to a height above the normal level of the liquid therein. The upper edge of said narrow cylinder 6, is flanged outwardly and downwardly, as indicated by the reference numeral 7, to afford a spillway for liquid flowing upwardly therethrough. Supported upon the bottom cross-piece 4, is a step bearing 8, in which is journalled the lower end of an axially disposed vertical shaft 9, and journalled around said shaft is a sleeve 10, which, together with said shaft, projects through a suitable stuffing box 11, mounted upon the top 3, of the apparatus. Secured upon the lower end of said shaft 9, is a propeller paddle wheel 12, and disposed directly thereabove and secured on the lower end of the sleeve 10, is another propeller paddle wheel 13, and the blades of said respective wheels are directed oppositely so that the same may rotate in opposite directions and yet act to direct a flow of the liquid upwardly within the inner cylinder 6. Secured upon the upper end of the sleeve 10, is a bevel pinion 14, and likewise secured upon the upper end of the shaft 9, is another bevel pinion 15, both of said bevel pinions meshing with a journal 16, secured on the end of a shaft 17, which is journalled in bearings 18, mounted on the top wall of the tank or cylinder.

Tight and loose pulleys 19 and 20, respectively, are connected on the end of said shaft 17, to receive a belt whereby the shaft 17, may be driven or not, as desired. A pressure gauge 21, is connected to the top wall 3, of the tank, and adjacent thereto is a pressure release or purge pipe provided with a valve 22, which, when opened, serves to permit discharge of undesirable gases. Communicating through the side walls of the cylinder or tank 1, is an inlet pipe 23, provided with a valve 24, whereby the hydrogen gas or other hydrogen containing fluid is admitted into the cylinder. Also connected in the side walls of the tank by means of suitable valved connections for the purpose, is a gauge glass 25, whereby the level of the liquid within the tank may be ascertained. For the purpose of viewing the operation as the process proceeds, eye pieces 26, are provided at various points in the side walls of the tank, a detail of construction of which is shown in Figure 4.

Surrounding said tank 1, is a circular manifold pipe 27, and communicating therewith and through the side walls of the tank 1, at a plurality of points, are pipes 28, which, on the interior of the tank 1, are provided with upwardly directed conical skimmer cups or mouth pieces 29, which, as the operation proceeds, are normally disposed just a trifle above the normal level of the liquid within the tank. An outlet pipe 30, leads from said circular manifold 27, downwardly through a three-way valve 31, into a power driven pump 32, and also communicating with said pump to receive the liquid passing therethrough, is an outlet pipe 33, leading into a three-way valve 34, which is connected to an inlet pipe 35, leading into the conical bottom of the tank 1. Also communicating with said inlet pipe 35, by means of a tee, is a drain pipe 36, provided with a valve 37. A supplementary pipe 38, is connected to said pipe 33, and is provided with a valve 39, for use in pumping the contents from the tank to filter presses or other suitable apparatus for further steps in the process. A by-pass 40, is provided connected into the respective three-way valves 31 and 34, to by-pass the liquid around the pump when so desired.

The purpose of the pump 32, is to cause a strong suction at the various cups 29, within the tank, thus drawing the gaseous hydrogen downwardly thereinto and up through the inlet pipe 35, into the oil in the form of large bubbles. As the pipe 35, is connected to the apex of the conical bottom 2, so that any catalyzer which may separate out falls towards the mouth of the pipe 35 and is carried upwards by the hydrogen bubbles issuing therefrom into the cylinder 6.

These large bubbles of hydrogen pass upwardly into the cylinder 6 and contact with the rapidly revolving paddle wheels or propellers 12 and 13 which subdivide them into fine bubbles and disseminate the fine bubbles so formed through the oil. Further the paddle wheels 12 and 13 also produce a rapid upward flow of the liquid within the inner cylinder 6, the liquid spilling over the upper edge thereof and progressing slowly downwardly in the main cylinder 1, to again flow upwardly within said inner cylinder 6, thus insuring a homogeneous mixture of the substance to be treated and the catalyzer, and of course, causing an intermixture therewith to some extent, of the hydrogen gas. The mechanical intermixture of the liquid and its suspended catalyzer with the hydrogen gases sets up a bubbling or splashing effect on the surface of the liquid in the tank 1, resulting in small quantities of the liquid intermittently spilling or splashing over the upper edges of said mouth pieces 29. Thus bubbling films of liquid are formed through which the hydrogen gases are drawn together with the small quantities of the liquid and its suspended catalyzer due to the suction of the pump 32, providing a positive means for exposing oils, fats or other similar substances carrying in suspension a finely divided catalyzer, to the action of hydrogen gas.

Of course, it is to be understood that any well known method of heating the contents of the tank may be utilized, such as a jacket 41 for saturated or preferably superheated steam so that a temperature somewhere between 150° and 200° C. may be maintained. Of course, too, the process may be carried on at pressures below or above atmospheric, although the best results are obtained at pressures greater than atmospheric. This, however, may depend to a large extent upon the catalyzer used.

I am aware that numerous details of construction may be varied through a wide range without departing from the principles of this invention, and I therefore do not purpose limiting the patent granted otherwise than necessitated by the prior art.

I claim as my invention:

1. In an apparatus of the class described, a container, an upright cylinder therein, means inducing a flow upwardly within said cylinder, and skimming devices rigidly secured in said container below the top of said cylinder to permit a flow outwardly through the skimming devices.

2. In an apparatus of the class described, a main container, an axially disposed cylinder therein projecting above the normal level of the liquid in said main container, a flange thereon affording a spillway for the liquid contents within said container, means for introducing hydrogen into the container into the space above the liquid contents, means for inducing a flow upwardly through said cylinder of the liquid contents causing the same to spill through the atmosphere of hydrogen in said main container, and a plurality of stationary skimmers disposed at the normal level of the liquid in said container and below said flange to receive the spilled liquid, and means for drawing the hydrogen and liquid through said skimmers.

3. In an apparatus of the class described, a container for holding gases and a liquid functioning in a hydrogenation process, a cylinder axially disposed therein, a flange formed on the upper end thereof, propeller wheels mounted within said cylinder, means for rotating the same in opposite directions to induce an upward flow of the liquid in said cylinder without producing a centrifugal effect, stationary skimmers within said container at the normal level of the liquid within the container to permit a mixture of the liquid and gas to be drawn off, and means connected therewith for again returning the mixture to said container.

4. In an apparatus of the class described, a container for liquid having a conical bottom, means including propeller blades mounted in a cylinder for circulating the liquid therein upwardly through the cylinder and downwardly at the sides of the container, and means for simultaneously drawing hydrogen from the upper part of the container and reintroducing it at the lowest part of said bottom to prevent sedimentation of the catalyzer mixed with the liquid.

5. In an apparatus of the class described, a container having a conical bottom, means for drawing hydrogen from the upper part of the container and re-introducing it in the form of bubbles at the lowest part of said bottom to prevent sedimentation of the catalyzer mixed with the oil, and screw propellers adapted to be rotated in opposite directions for mechanically subdividing said bubbles after introduction into the liquid, disseminating the fine bubbles so formed through the liquid and simultaneously circulating the liquid in the container upwardly at the center and downwardly at the sides, together with means for spilling the mixture through an atmosphere of hydrogen at the end of its upward movement.

6. In an apparatus of the class described, a container, mechanical mixing means in the container, skimming devices, and a pump for drawing a gas over thin films of a substance on the skimming devices by forced suction, the thin films being constantly broken up and renewed by the combined action of the gas and the mixing means.

7. In an apparatus for hydrogenating oil, a container, skimming devices therein, means for mechanically mixing a catalyzer with the oil, and means for forcibly drawing hydrogen over thin films of the oil on said skimming devices, said thin films being constantly broken up and replaced.

8. In an apparatus of the class described, a container, mechanical mixing means for the substance in the container, means for supporting thin films of the substance in position in the container, a pump connected with said means for drawing a gas over the supported films, and means for applying heat in regulated quantities to the container.

9. In an apparatus for hydrogenating oil, a container, means for mechanically mixing a catalyzer with the oil, means for forcibly drawing hydrogen over thin films of the oil, mechanical means for maintaining said thin films, and means for applying heat in regulated quantities to the oil in the container.

10. An apparatus for hydrogenating a substance, including a container, film supporting means in the container, means for mixing the substance with a catalyzer, means for causing a rapid flow of the mixture through a straight path, together with large bubbles of hydrogen, means for spilling the mixture through an atmosphere of hydrogen and a pump provided for drawing hydrogen gas over thin exposed films of the mixture while it is constantly agitated and to further cause a slow flow of the mixture of catalyzer and oil through a circuitous path together with small bubbles of hydrogen.

11. An apparatus for hydrogenating a substance, which includes a tank, film supporting surfaces in the tank at the normal level of the contained liquid, means to maintain thin films of the substance upon said surfaces, and means for causing a continuous renewal of the thin films.

12. An apparatus for hydrogenating a substance, including a container therefor, means for instituting a continuous flow of the substance without centrifugal effect, an atmosphere of hydrogen in the container through which the substance is spilled, and means for pumping hydrogen through small bubbling masses of the substance, together with means for applying heat in regulated quantities thereto.

13. An apparatus for hydrogenating a substance, which includes a tank, film supporting surfaces in the tank at the normal level of the contained liquid, means to maintain thin films of the substance upon said surfaces, means for causing a continuous renewal of the thin films, and means for drawing the mixture of substance and catalyzer through a circuitous path, together with quantities of bubbles of hydrogen.

14. An apparatus for hydrogenating unsaturated fatty substances which includes means for causing separate portions of a mixture of the unsaturated substances and a catalyzer to flow in separate paths, skimming means in one of said paths together with means for drawing hydrogen into small quantities of the mixture and forcing the same through restricted passages in one of said paths.

15. An apparatus for hydrogenating unsaturated fatty substances, which includes a container for the substances, means for maintaining an atmosphere of hydrogen in the container, skimming devices in the container, means for causing separate mixtures of the unsaturated substances and a catalyzer to flow in separate paths, means for drawing small quantities of the mixture by forced suction over said skimming devices and through restricted passages in one of said paths, together with small bubbles of hydrogen, said hydrogen being drawn from the above named atmosphere of hydrogen, and means for spilling the mixture through said atmosphere of hydrogen.

16. An apparatus for hydrogenating an oil, which includes a reservoir for a mixture of oil and catalyzer, means for causing a continuous rapid upward flow of the oil and catalyzer through a portion of the reservoir, a spillway over which the mixture of oil and catalyzer, together with hydrogen bubbles is spilled into an atmosphere of hydrogen, said atmosphere of hydrogen being maintained above the reservoir, means for pumping bubbles of hydrogen through the films of oil while in motion, and means for applying heat in regulated quantities to the mass.

17. An apparatus for hydrogenating an oil, which includes a reservoir for a mixture of oil and catalyzer, skimming devices in the reservoir, means for causing a rapid flow of the mixture in one direction without centrifugal effect, means for spilling the mixture of oil and catalyzer, together with large bubbles of hydrogen through an atmosphere of hydrogen, said atmosphere of hydrogen being maintained above the reservoir, and means for drawing the mixture of oil and catalyzer together with small bubbles of hydrogen over skimming devices and through restricted passages in small quantities in another direction and along a circuitous path back into the reservoir.

In testimony whereof I have hereunto subscribed my name in the presence of two subscribing witnesses.

WILLIAM B. ALLBRIGHT.

Witnesses:
EARL M. HARDINE,
OSCAR HARTMANN.